United States Patent Office 2,792,391
Patented May 14, 1957

2,792,391

PROCESS FOR THE MANUFACTURE OF SULFONAMIDES

Paul Mueller and Robert Trefzer, Basel, Switzerland, assignors to Ciba Pharmaceutical Products Inc., Summit, N. J.

No Drawing. Application June 9, 1955,
Serial No. 514,366

Claims priority, application Switzerland June 15, 1954

5 Claims. (Cl. 260—239.75)

This invention relates to an improved process for the manufacture of sulfonamides, especially $N_1$-heterocyclic substituted para-aminobenzene-sulfonamides, particularly of 6-(p-aminobenzene-sulfonamido)-2,4-dimethyl-pyrimidine, by condensation of aromatic sulfonic acid halides with amines in the presence of a teriary amine. The sulfonamides, or so-called "sulfas," are well-known chemotherapeutic agents of recognized utility and widely employed in medicine. Examples of such compounds are sulfapyrimidines such as the 6-(para-aminobenzene-sulfonamido)-pyrimidines, more particularly 6-(para-aminobenzene - sulfonamido) - 2,4 - dimethyl - pyrimidine, and sulfathiazoles, such as 2-(para-aminobenzene-sulfonamido)-thiazole.

In the preparation of aromatic sulfonamides such as sulfa drugs, it is known to react an aromatic sulfonic acid halide with an amine, for example, a heterocyclic amine, in the presence of certain tertiary amines, such as pyridine, as condensing agents. In certain cases however, the yields are unsatisfactory, especially in the reaction of a benzene sulfonic acid halide with a 6-amino-pyrimidine, such as 6-amino-2,4-dimethyl-pyrimidine. Trimethylamine has been proposed as a suitable condensing agent. This amine appears to occupy a special position, because, for example, in the condensation of a 6-amino-pyrimidine with a benzene sulfonic acid halide in the presence of triethylamine poor yields are obtained. However, the use of trimethylamine is attended by various disadvantages. Thus, for example, it is difficult to handle owing to its extraordinarily low boiling point of only 3.5° C. Furthermore, it is difficult to regenerate or recover, owing to its high volatility, and even when closed apparatus is used, it is not possible to avoid exposing the operator to the intense and clinging fishlike odor of the amine.

Surprisingly it has been found according to the present invention that the aforesaid disadvantages are avoided by reacting an aromatic sulfonic acid halide with an amine in the presence of $\omega,\omega'$-bis-(dimethyl-amino)-alkanes, of which the alkylene chain contains at least six carbon atoms, and advantageously in the presence of $\omega,\omega'$-bis-(dimethyl-amino)-alkanes, of which the alkylene chain contains from 6 to 9 carbon atoms. The alkylene chain of the said compounds is advantageously unsubstituted; however, it may be substituted by lower alkyl groups, for example by methyl groups. As compared with trimethylamine these diamines possess the advantage of a high boiling point, so that they are easy to handle, and can be used for carrying out condensations requiring relatively high temperatures, without the need of working in an autoclave. Regeneration can be carried out in a simple manner. A further advantage is that they do not possess an unpleasant odor.

The process of this invention is especially suitable for the condensation of a benzene sulfonic acid halide, especially the chloride, which contains in the para-position a substituent convertible into an amino group, for example by hydrolysis or reduction, such as an acetylamino, carbalkoxyamino or a nitro group, with a heterocyclic amine, for example, a hetero-monocyclic amine, especially a 6-amino-pyrimidine or a 2-amino-thiazole, and above all 6-amino-2,4-dimethyl-pyrimidine or 2-amino-thiazole. After the condensation, the substituent convertible into an amino group can be converted into a free amino group in the usual manner, an acylated amino group can be hydrolyzed or a nitro group reduced by procedures well known to those skilled in the art. If the condensation yields sulfonamides which are substituted by a sulfonic acid group, the latter may be split off by usual methods, for example by hydrolyzing agents, possibly by simultaneous formation of the free amino group.

The condensations are advantageously carried out in the presence of diluents. As diluents there may be used, for example, organic solvents free from hydroxyl groups, such as substituted or unsubstituted aromatic or cycloaliphatic hydrocarbons, for example, benzene, toluene, methylene chloride, ethylene chloride, chlorobenzene or nitrobenzene, and also ketones or esters. The starting materials and the condensing agent may be used in stoichiometric proportions. Alternatively, more especially the sulfonic acid halide may be used in excess, for example in the proportion 2 mols sulfonic acid halide:1 mol amine, and correspondingly the content of the condensing agent may be increased too.

The following examples are intended to illustrate but not to limit the invention:

Example 1

800 cc. of nitrobenzene are placed in a reaction vessel, and 60 grams of 6-amino-2,4-dimethyl-pyrimidine and then 171 grams of dry para-acetylaminobenzene sulfonic acid chloride are introduced at 20–25° C., while stirring vigorously. 65 grams of 1,6-bis-dimethylaminohexane are then introduced dropwise in the course of 6 hours at an internal temperature of 45° C. with the exclusion of moisture.

The yellow solution is then stirred for a further 15 hours at 40–45° C. 600 grams of caustic soda solution of 30 percent strength are slowly added and the whole is heated for 2 hours at 90° C. while stirring well. After being cooled to 30–40 C., the mixture is filtered to remove the precipitated sodium salt, the precipitate is washed with caustic soda solution of 30 percent strength, and then washed with 300 cc. of fresh nitrobenzene in portions. The residue is taken up in 1000 cc. of water, and the nitrobeneze still present is removed by azeotropic distillation in vacuo while continuously replacing the water distilled off. The aqueous solution which remains behind is filtered hot with animal carbon. By neutralizing the solution of the sodium salt with hydrochloric acid, there is obtained 6-(para-aminobenzene-sulfonamido)-2,4-dimethyl-pyrimidine in a yield amounting to 70 percent calculated on the 6-amino-2,4-dimethyl-pyrimidine used as starting material.

Example 2

93.5 grams of dry para-acetylaminobenzene sulfonic acid chloride (100%) are introduced into 250 cc. of nitrobenzene while stirring vigorously at 20–25° C. In the course of 4 hours there is entered at 25° C. a solution of 20.05 grams of 2-aminothiazole in 120 cc. of nitrobenzene and the solution is stirred for another hour. With the exclusion of moisture, there are then added dropwise in the course of 10 hours at 25° C. 41.35 grams of 1,6-bis-dimethylamino-hexane (100%; boiling point under a pressure of 15 mm., 96° C.), and the pale brown suspension is then stirred for 6 hours at 25° C. and for 2 hours at 55° C. After this, 512 grams of caustic soda solution of 12.5 percent strength (by weight) are added and the whole stirred vigorously at 80° C. for one hour.

A sediment is then allowed to form at 45–50° C., the nitrobenzene is removed, and the separated saponification solution is stirred with 100 cc. of benzene which is also separated at 45–50° C. The saponification liquor, after being freed from the solvents, is finally stirred for another 3 hours at 96–98° C., after which 135 grams of caustic soda of 90 percent strength are added while cooling with water. After cooling, the solution is filtered and the precipitated sodium salt washed with 100 cc. of caustic soda solution of 30 percent strength (by weight). The resulting sodium salt is dissolved in 200 cc. of water at 55–60° C., stirred with decolorizing carbon, and filtered. On neutralizing the sodium salt solution with hydrochloric acid (1:1 v./v.=1 volume of concentrated hydrochloric acid diluted by 1 volume of water) while cooling with water, there is obtained the 2-(para-aminobenzene-sulfonamido)-thiazole in a yield of 87% calculated on the 2-aminothiazole used. The product can be further purified over the sodium salt.

*Example 3*

495 cc. of nitrobenzene are placed in a reaction vessel, and 60 grams of 6-amino-2,4-dimethyl-pyrimidine and then 171 grams of dry para-acetylaminobenzene sulfonic acid chloride of 100% strength are introduced at 20–25° C., while stirring vigorously. The mixture is maintained at 65° C. for one hour with the exclusion of moisture. 69.4 grams of 1,6-bis-dimethylaminohexane (boiling point 96° C. under 15 mm. of pressure) dissolved in 75 cc. of nitrobenzene are added dropwise in the course of 10 hours at 45° C. The pale brown reaction mixture is stirred for a further 12 hours at 45° C., and then neutralized with sulfuric acid of 50% strength until a drop of the neutralized mixture shows only a weak orange color on moistened brilliant yellow paper. 495 cc. of nitrobenzene are then distilled off under about 10–12 mm. of pressure and at a distillation temperature of about 85–95° C.

The brown distillation residue is vigorously stirred with 940 grams of caustic soda solution (12.5% by weight) for 3 hours at 85–90° C., the remaining nitrobenzene separated off at 45–50° C. and the hydrolysis mixture stirred twice with 100 cc. of benzene on each occasion at 45–50° C. From the solvents separated in this way from the hydrolysis liquor, 1,6-bis-dimethylaminohexane can be regenerated in good yield.

The hydrolysis solution obtained after separating off the solvents is then further stirred for 5 hours at 96–98° C. The excess of alkali is neutralized with about 120 cc. of hydrochloric acid (1:1 v./v.) at 20° C., the solution treated with decolorizing charcoal and filtered. After neutralizing the sodium salt solution with hydrochloric acid (1:1 v./v.) there is obtained 6-(para-aminobenzene-sulfonamido)-2,4-dimethyl-pyrimidine in a yield of 77% calculated on 6-amino-2,4-dimethyl-pyrimidine used. The product can be further purified over the sodium salt.

The recovery of the 1,6-bis-(dimethyl-amino)-hexane used as condensing agent from the mixture of solvents separated off may be carried out as follows:

The layers of solvents of nitrobenzene and benzene separated from the hydrolysis liquor are combined, the solution of the bases being first dried by azeotropic distillation of the benzene over a column at atmospheric pressure. The benzene thus recovered contains about 1–2% of the 1,6-bis-dimethylaminohexane used as starting material and is employed for the extraction of the hydrolysis liquor of a subsequent batch.

The remaining nitrobenzene solution is distilled off to dryness in vacuo under about 15 mm. of pressure and at about 95° C. In the resulting basic nitrobenzene distillate there are about 91–93% of the 1,6-bis-dimethylamino-hexane. This solution can be used immediately for the next condensation after being made up again to the required quantity. A total of about 93–94% of the 1,6-bis-dimethylamino-hexane used as starting material is thus recovered with the benzene and nitrobenzene distillates.

*Example 4*

30 grams of 6-amino-2,4-dimethyl-pyrimidine and then 99.6 grams of dry para-acetylaminobenzene sulfonic acid chloride of 100 percent strength are introduced into 200 cc. of nitrobenzene while stirring vigorously at 20–25° C. The mixture is maintained at 65° C. for one hour with the exclusion of moisture, and then 43.9 grams of 1,7-bis-dimethylamino-heptane (boiling point 105° C. under 11 mm. of pressure) dissolved in 200 cc. of nitrobenzene are added dropwise at 45° C. in the course of 6 hours. The pale brown solution is then stirred for 12 hours at 45°, and then neutralized with sulfuric acid of 50% strength, until a drop of the neutralized mixture shows only a slightly orange color on moistened brilliant-yellow-paper. 200 cc. of nitrobenzene are then distilled off in vacuo under about 10–12 mm. of pressure and at a distillation temperature of about 85–95° C. The brown distillation residue is vigorously stirred with 690 grams of caustic soda solution (10% by weight) for 3 hours at 85–90° C., the remaining nitrobenzene separated off at 45–50° C. and the hydrolysis mixture stirred with benzene at 45–50° C. From the solvents separated in this way from the hydrolysis liquor, 1,7-bis-dimethylaminoheptane can be regenerated in good yield.

The hydrolysis solution obtained after separating off the solvents is then further stirred for 5 hours at 96–98° C. The excess of alkali is neutralized with about 120 cc. of hydrochloric acid (1:1 v./v.) at 20° C., the solution treated with decolorizing charcoal and filtered. After neutralizing the sodium salt solution with hydrochloric acid (1:1 v./v.) there is obtained 6-(para-aminobenzene-sulfonamido)-2,4-dimethylpyrimidine in a yield of 86% calculated on 6-amino-2,4-dimethylpyrimidine used.

*Example 5*

455 cc. of nitrobenzene are placed in a reaction vessel, and 60 grams of 6-amino-2,4-dimethyl-pyrimidine and then 171 grams of dry para-acetylaminobenzene sulfonic acid chloride of 100% strength are added at 20–25° C. while stirring vigorously. The mixture is maintained for 1 hour at 65° C. with the exclusion of moisture, and 80.7 grams of 1,8-bis-dimethylamino-octane (boiling point 78° C. under 1 mm. of pressure) dissolved in 75 cc. of nitrobenzene are added dropwise in the course of 10 hours at 45° C. The pale brown reaction mixture is stirred for a further 12 hours at 45° C., and then neutralized with sulfuric acid 50% strength until a drop of the neutralized mixture shows only a weak orange color on moistened brilliant yellow paper. 455 cc. of nitrobenzene are then distilled off in vacuo under about 10–12 mm. of pressure and at a distillation temperature of 85–95° C.

The brown distillation residue is vigorously stirred with 940 grams of caustic soda solution (12.5% by weight) for 3 hours at 85–90° C., the remaining nitrobenzene separated off at 45–50° C. and the hydrolysis liquor stirred twice with 100 cc. of benzene on each occasion at 45–50° C. From the solvents separated in this way from the hydrolysis mixture, 1,8-bis-dimethylamino-octane can be regenerated in good yield.

The hydrolysis liquid obtained after separating off the solvents is then further stirred for 5 hours at 96–98° C. The excess of alkali is neutralized with about 120 cc. of hydrochloric acid (1:1 v./v.) at 20° C., the solution treated with decolorizing charcoal and filtered. After neutralizing the sodium salt solution with hydrochloric acid (1:1 v./v.) there is obtained 6-(para-aminobenzene-sulfonamido)-2,4-dimethylpyrimidine in a yield of 78% calculated on 6-amino-2,4-dimethylpyrimidine used.

*Example 6*

115 cc. of nitrobenzene are placed in a reaction vessel and 15 grams of 6-amino-2,4-dimethyl-pyrimidine and then 42.75 grams of dry para-acetylamino-benzene sulfonic acid chloride of 100% strength are introduced at 20-25° C. while stirring vigorously. The mixture is maintained for one hour at 65° C. with the exclusion of moisture and 21.6 grams of 1,9-bis-dimethylamino-nonane (boiling point 74° C. under 0.2 mm. of pressure) dissolved in 25 cc. of nitrobenzene are added dropwise at 45° C. in the course of 10 hours. The pale brown reaction mixture is stirred for 12 hours at 45° C. and then neutralized with sulfuric acid of 50% strength until a drop of the neutralized mixture shows only a weak orange color on moistened brilliant yellow paper. 115 cc. of nitrobenzene are then distilled off in vacuo under about 10-12 mm. of pressure and at a distillation temperature of 85-95° C.

The brown distillation residue is vigorously stirred with 235 grams of caustic soda solution (12.5% by weight) for 3 hours at 85-90 ° C., the remaining nitrobenzene separated off at 45-50° C. and the hydrolysis liquor stirred at 45-50° C. twice with 50 cc. of benzene each time. From the solvents separated in this way from the hydrolysis liquor, 1,9-bis-dimethylamino-nonane can be regenerated in good yield, for example, by distillation under reduced pressure. Owing to its slight solubility in water it can, if desired, be recovered by steam distillation.

The hydrolysis liquor obtained after separating off the solvents is then further stirred for 5 hours at 96-98° C. The solution is treated at 20° C. with decolorizing charcoal and filtered. After neutralizing the sodium salt solution with hydrochloric acid (1:1 v./v.) there is obtained 6 - (para-aminobenzene - sulfonamido) - 2,4 - dimethyl-pyrimidine in a yield of 79% calculated on 6-amino-2,4-dimethyl-pyrimidine used.

Instead of employing para-acetylamino benzene sulfonic acid chloride in the aforesaid examples, the corresponding p-nitro- and p-carbalkoxyamino-benzene sulfonic acid chlorides can be employed. The nitro compounds obtained are then reduced and the carbalkoxyamino compounds obtained are hydrolyzed by procedures well known in this art. The corresponding sulfonic acid bromides can be employed instead of the aforesaid chlorides.

What is claimed is:

1. In a process for the preparation of sulfonamides by reacting a benzene sulfonic acid halide of the formula:

wherein Hal stands for a member selected from the group consisting of chlorine and bromine, and X represents a member selected from the group consisting of an acylamino group hydrolyzable to an amino group and a nitro group reducible to an amino group with an amine selected from the group consisting of 6-amino-2,4-dimethyl-pyrimidine and 2-amino-thiazole in the presence of a condensing agent and subsequent conversion of the substituent X into the free amino group, the step which comprises carrying out the said first reaction in the presence of a diamine of the formula:

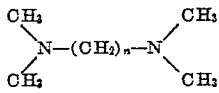

wherein $n$ is at least 6, as the condensing agent.

2. In a process for the preparation of sulfonamides by reacting a benzene sulfonic acid halide of the formula:

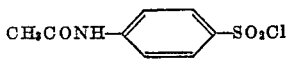

with 6-amino-2,4-dimethyl pyrimidine in the presence of a condensing agent and subsequent conversion of the acetylamino group into the free amino group, the step which comprises carrying out the said first reaction in the presence of a diamine of the formula:

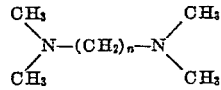

wherein $n$ is at least 6, as the condensing agent.

3. In a process for the preparation of sulfonamides by reacting a benzene sulfonic acid halide of the formula:

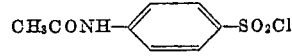

with 6-amino-2,4-dimethyl pyrimidine in the presence of a condensing agent and subsequent conversion of the acetylamino group into the free amino group, the step which comprises carrying out the said first reaction in the presence of a diamine of the formula:

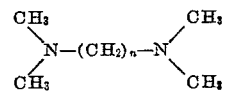

wherein $n$ is a positive integer from 6 to 9, as the condensing agent.

4. In a process for the preparation of sulfonamides by reacting a benzene sulfonic acid halide of the formula:

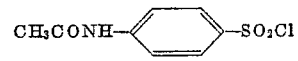

with 2-amino-thiazole in the presence of a condensing agent and subsequent conversion of the acetylamino group into the free amino group, the step which comprises carrying out the said first reaction in the presence of a diamine of the formula:

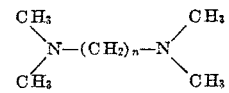

wherein $n$ is at least 6, as the condensing agent.

5. In a process for the preparation of sulfonamides by reacting a benzene sulfonic acid halide of the formula:

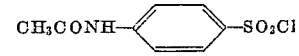

with 2-amino-thiazole in the presence of a condensing agent and subsequent conversion of the acetlyamino group into the free amino group, the step which comprises carrying out the said first reaction in the presence of a diamine of the formula:

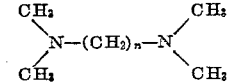

wherein $n$ is a positive integer from 6 to 9, as the condensing agent.

References Cited in the file of this patent

UNITED STATES PATENTS

| 2,395,484 | Jennings | Feb. 26, 1946 |

FOREIGN PATENTS

| 886,009 | France | June 15, 1943 |
| 495,650 | Belgium | May 31, 1950 |
| 990,388 | France | June 6, 1951 |
| 881,345 | Germany | June 29, 1953 |
| 1,089,732 | France | Oct. 6, 1954 |
| 1,089,956 | France | Oct. 13, 1954 |